US012311683B2

(12) United States Patent
Sambhy et al.

(10) Patent No.: US 12,311,683 B2
(45) Date of Patent: May 27, 2025

(54) SYSTEM AND METHOD FOR OPERATING AN INKJET PRINTER TO ATTENUATE INK DRYING IN THE INKJETS DURING PRINTING OPERATIONS

(71) Applicant: Xerox Corporation, Norwalk, CT (US)

(72) Inventors: Varun Sambhy, Pittsford, NY (US); Jason M. LeFevre, Penfield, NY (US); Seemit Praharaj, Webster, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 168 days.

(21) Appl. No.: 18/164,225

(22) Filed: Feb. 3, 2023

(65) Prior Publication Data

US 2024/0262114 A1 Aug. 8, 2024

(51) Int. Cl.

| | |
|---|---|
| ***B41J 29/17*** | (2006.01) |
| ***B41J 2/165*** | (2006.01) |
| ***B41J 11/00*** | (2006.01) |

(52) U.S. Cl.

CPC ........... *B41J 29/17* (2013.01); *B41J 2/16526* (2013.01); *B41J 11/007* (2013.01)

(58) Field of Classification Search

CPC ........ B41J 2/16526; B41J 11/007; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175;

(Continued)

(56) References Cited

U.S. PATENT DOCUMENTS

| | | | |
|---|---|---|---|
| 5,659,342 | A | 8/1997 | Lund et al. |
| 9,216,572 | B2 | 12/2015 | Sudo et al. |

(Continued)

*Primary Examiner* — Manish S Shah

(74) *Attorney, Agent, or Firm* — Maginot Moore & Beck LLP

(57) ABSTRACT

An inkjet printer and method of operating the inkjet printer ejects ink drops onto coated areas of a media transport exposed in the inter-document zones between successive media sheets passing through a print zone of the printer to maintain the operational status of the inkjets ejecting the ink drops. Absorbent material is positioned outside of the print zone to contact the media transport and remove the ejected ink drops from the coated areas. The absorbent material can be configured about two rollers so operating an actuator to rotate one of the rollers pulls absorbent material from a supply roll to a take-up roll to provide clean absorbent material for removal of the ejected ink drops from time to time.

18 Claims, 4 Drawing Sheets

(58) Field of Classification Search
CPC .... B41J 2/17563; B41J 29/17; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 9,895,893 | B2 | 2/2018 | Yamazaki et al. |
| 2004/0263560 | A1* | 12/2004 | Nakashima .......... B41J 2/16585 347/32 |
| 2010/0091053 | A1 | 4/2010 | Jackson et al. |
| 2014/0176633 | A1 | 6/2014 | Gerrits |
| 2015/0328882 | A1 | 11/2015 | Van Sas |
| 2017/0361607 | A1 | 12/2017 | Fortia et al. |
| 2018/0037733 | A1* | 2/2018 | Guzman ................ C08G 18/61 |
| 2018/0297382 | A1 | 10/2018 | MacKenzie et al. |
| 2020/0290373 | A1* | 9/2020 | McLaughlin ........ B41J 11/0095 |

* cited by examiner

SYSTEM AND METHOD FOR OPERATING AN INKJET PRINTER TO ATTENUATE INK DRYING IN THE INKJETS DURING PRINTING OPERATIONS

TECHNICAL FIELD

This disclosure is directed to printheads that eject liquid ink to form ink images on substrates as they pass the printheads and, more particularly, to the operation of the inkjets during ink image printing to help maintain the operational status of the inkjets in the printheads.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead driver. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

Inkjets, especially those in printheads that eject aqueous inks, need to regularly fire to help prevent the ink in the nozzles from drying. If the viscosity of the ink increases too much, the probability of an inkjet failure increases substantially. To maintain the operational status of the inkjets, each inkjet is periodically operated to eject single drops from each nozzle in some prescribed pattern onto a printed page. This pattern is designed to be below the visibility threshold of the viewer. If the pattern is too dense, however, the pattern may be perceptible and thus objectionable. If the pattern is not dense enough, the firing frequency of the inkjets may be insufficient to maintain the operational status of the inkjets. This method is typically referred to as "sneezing" or "background jetting."

Other types of inkjet operations are also used in some printers to maintain operational status of the inkjets. In some printers, all the inkjets are operated at the leading edge of a media sheet to form what is sometimes called a flush line. After the print job is completed, the leading edge is trimmed from the sheet to remove the flush line. The addition of a trimming step to remove the flush line is not acceptable in some situations. In other printers, a media sheet is inserted into the print job periodically and a flush line is formed on the media sheet. The sheet can be recirculated to pass the printheads after the passage of another interval so the inkjets of the printhead can form another flush line on the sheet. This sheet on which the flush lines are formed are removed from the output of the print job once the job is completed. This method is often viewed as wasteful of both ink and media sheets. Inkjet printers would benefit from approaches to maintain the operational status of the inkjets while eliminating sneeze patterns, flush lines, or waste of media sheets.

SUMMARY

A new method of operating inkjets in an inkjet printer during printing operations maintains the operational status of the inkjets while eliminating sneeze patterns, flush lines, or waste of media sheets. The method includes operating inkjets to eject ink drops onto areas of a media transport exposed to the inkjets between a trailing edge of a first media sheet and a leading edge of a next media sheet in a process direction; and removing the ejected ink drops from the areas of the media transport after the areas of the media transport exit a print zone in the inkjet printer.

A new inkjet printer operates inkjets in an inkjet printer during printing operations to maintain the operational status of the inkjets while eliminating sneeze patterns, flush lines, or waste of media sheets. The new inkjet printer includes a conveyor belt configured to carry media sheets through the inkjet printer, the conveyor belt having areas that are coated with ink repellant material; at least one printhead configured to eject ink drops as the media sheets pass the at least one printhead; a controller operatively connected to the at least one printhead. The controller is configured to: operate inkjets in the at least one printhead to eject ink drops onto at least one coated area when the at least one coated area is in an inter-document zone between a first media sheet and a second media sheet.

A new conveyor belt is configured for use in an inkjet printer to enable the printer to maintain the operational status of the inkjets while eliminating sneeze patterns, flush lines, or waste of media sheets. The conveyor belt includes an endless belt configured to be wound about a plurality of rollers to position a portion of the endless belt opposite at least one printhead in the inkjet printer; and a plurality of areas on the endless belt that are coated with an ink repellant material, adjacent coated areas on the endless belt in a process direction have a length in a cross-process direction that is less than a distance across the endless belt in the cross-process direction.

BRIEF DESCRIPTION OF THE DRAWINGS

The foregoing aspects and other features of operating an inkjet printer to maintain the operational status of the inkjets while eliminating sneeze patterns, flush lines, or waste of media sheets are explained in the following description, taken in connection with the accompanying drawings.

DETAILED DESCRIPTION

Figure 1:
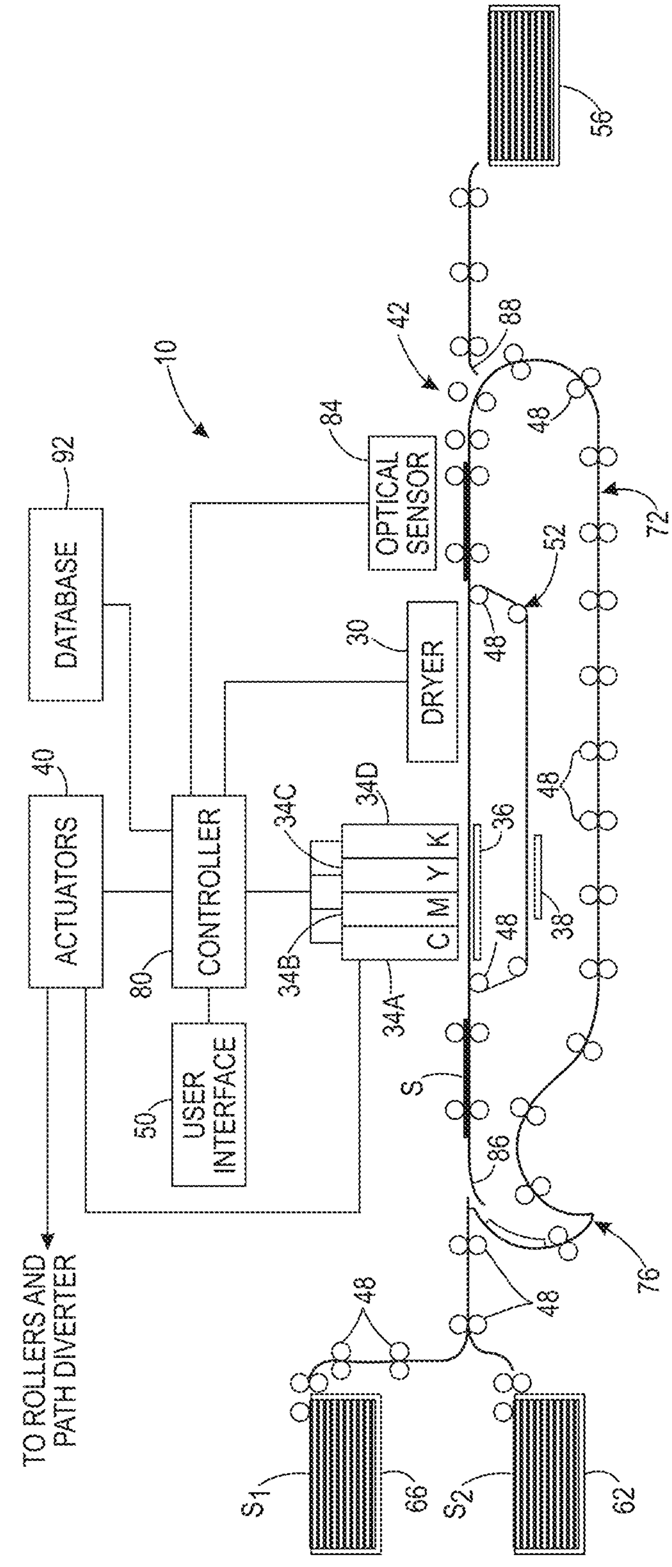
FIG. 1 depicts an inkjet printer that maintains the operational status of the inkjets while eliminating sneeze patterns, flush lines, or waste of media sheets.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward the media. As used herein, the term "process direction" refers to a direction of travel of an image receiving surface, such as an imaging drum or print media, and the term "cross-process direction" is a direction that is substantially perpendicular to the process direction along the surface of the image receiving surface. As used in this document, the term "inkjet maintenance ink drop" refers to non-image ink drops ejected by identified inkjets to maintain the operational status of the inkjets in the printer. Also, the description presented below is directed to a system configured for operating inkjets in an inkjet printer to maintain inkjet operation that is applicable to similar imaging devices that generate images with pixels of other types of marking material.

The printer and method described below eject ink drops onto a transport belt strip located in an inter-document zone (IDZ) on a media transport belt in the print zone of an inkjet printer. The ejected ink drops are removed from the transport belt before that portion of the transport belt returns to the print zone. Thus, the operational status of the inkjets are maintained while eliminating sneeze patterns, flush lines, or waste of media sheets.

FIG. 1 depicts a high-speed color inkjet printer 10 that maintains the operational status of the inkjets while eliminating sneeze patterns, flush lines, or waste of media sheets. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers that drive the media transport 42 that passes through the print zone PZ of the printer. The portion of the media transport 42 within the print zone PZ includes an endless conveyor belt 52 configured about rollers 48. A vacuum source (not shown) is connected to the vacuum plenum 36 to produce a vacuum pull through apertures in the conveyor belt 52 to help hold substrates to the conveyor belt 52 as they passed through the print zone. As used in this document, the term "print zone" means that portion of the media transport that is opposite the printheads in the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media. As discussed in more detail below, a transport belt cleaner 38 is positioned outside of the print zone PZ to remove ink drops from transport belt strips located on the conveyor belt 52.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet for duplex printing of the sheet. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise, a substrate from media transport 42 is diverted to the duplex path 72. Rotating the pivoting member 88 in the clockwise direction from the diverting position closes access to the duplex path 72 so substrates on the media transport move to the receptacle 56. At position 76, the media sheet flips so the unprinted side of the media sheet can be presented to the printheads when the controller 80 operates an actuator to rotate pivoting member 86 in the counterclockwise direction and merge a substrate from the duplex path 72 into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80 to identify image quality issues in the printed images generated by the printer. The optical sensor 84 can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image containing the image content and the sneeze pattern to be printed on a media sheet.

Figure 2:
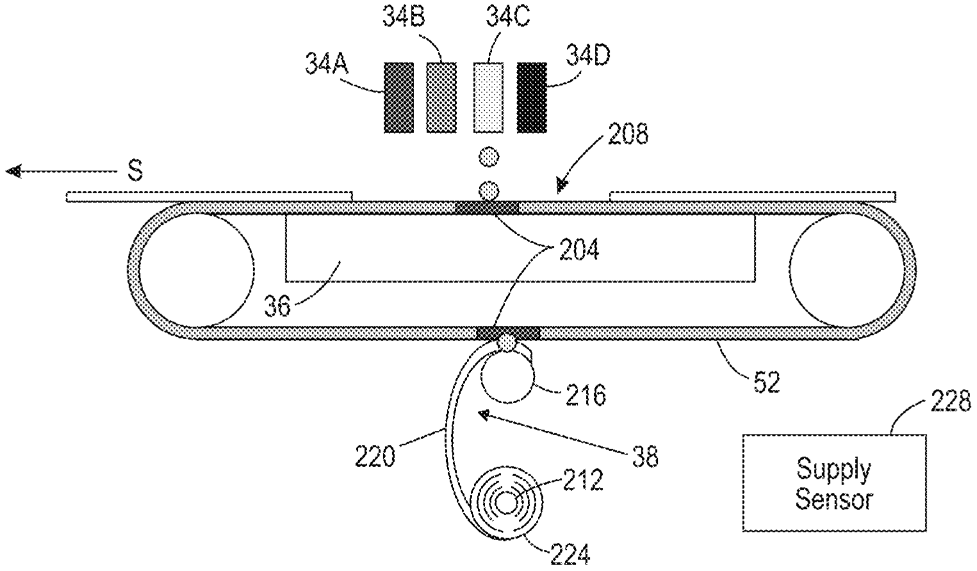
FIG. 2 depicts the belt cleaner of FIG. 1 in more detail.

As shown in FIG. 2, conveyor belt 52 is configured with conveyor belt strips 204 on its surface at various intervals in the process direction. The strips 204 on the conveyor belt 52 are exposed to the printheads 34A, 34B, 34C, and 34D in the inter-document zones 208 between successive media sheets from time to time. As used in this document, the term "inter-document zone or IDZ" means a portion of a conveyor belt or other transport belt exposed between successive substrates being carried by the conveyor belt or other media transport. The controller 80 is configured with programmed instructions that when executed cause the controller to track the locations of the conveyor belt strips 204 on the conveyor belt 52 along with the leading and trailing edges of the media sheets so when all or a portion of a conveyor belt strip 204 is located within an IDZ so it is exposed to one or more printheads, the controller 80 operates the one or more printheads opposite the exposed conveyor belt strip 204 to eject ink drops onto the conveyor belt strip 204 exposed in the IDZ. These ejected ink drops help maintain the operational status of the inkjets that ejected the ink drops. When the conveyor belt strips 204 pass by the conveyor belt cleaner 38, the ejected ink drops are removed before the conveyor belt strip 204 before the strip returns to the print zone PZ.

With continued reference to FIG. 2, the conveyor belt cleaner 38 includes a supply roller 212 and a take-up roller 216. The supply roller 212 is configured to receive a roll of absorbent material 220. For example, absorbent material can be wound around a hollow member and the hollow member can be slipped over the supply roller 212. The take-up roller 216 is configured to receive one end of the absorbent material that extends from the roll of absorbent material 220 mounted on the supply roller 212. For example, the take-up roller 216 can be configured with a slot to receive the end of the roll 220 mounted on the supply roller 212. An actuator 40 is operatively connected to the take-up roller 216 and is configured to rotate the roller 216. The controller 80 is further configured to operate one of the actuators 40 to pull clean absorbent material from the roll 220 of absorbent material into contact with the conveyor belt at a position outside of the print zone. In this manner, the cleaning capability of the belt cleaner 38 is renewed and clean absorbent material can be maintained at the nip between the conveyor belt 52 and the conveyor belt cleaner 38. A supply sensor 228 is configured to emit a light beam toward the supply roller 212 and receive reflection of the light beam from the roll 224 or the roller 212. When the supply roll 224 is exhausted, the supply roller 212 is exposed to the light beam and the change in the intensity of the reflection causes the sensor 228 to generate a signal to the controller 80 that the supply roll 224 has been exhausted. The controller 80 then generates a signal that can be displayed on the user interface 50 or used to operate an annunciator to indicate the supply roll 224 needs replacing. Examples of absorbent material that are configured to absorb ink drops from the conveyor belt strips 204 include fabrics made of woven or non-woven cellulose, nylon, cotton, polyester, rayon, silk, wool, or blends of these materials. The roll 224 is at least as wide as the conveyor belt 52 in the cross-process direction.

Figure 3:
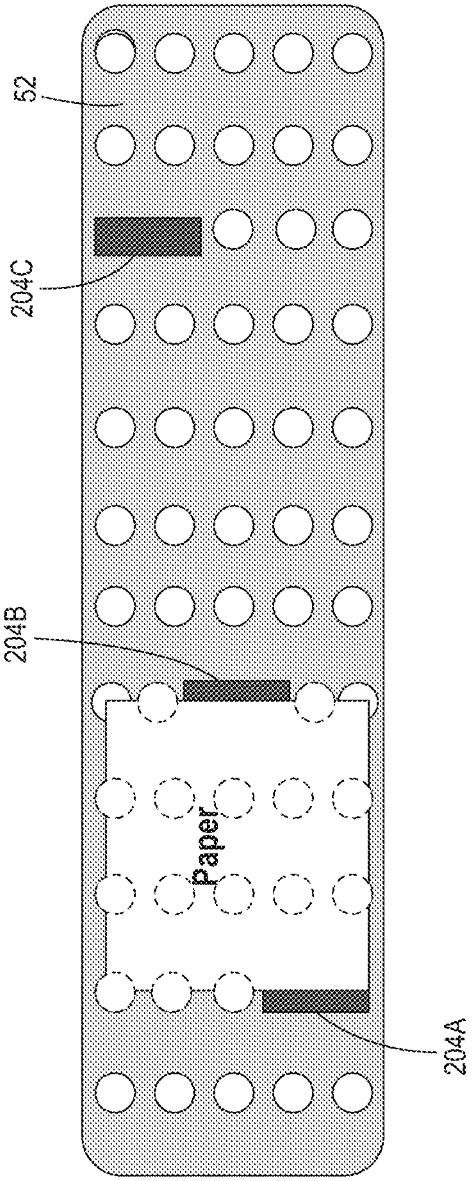
FIG. 3 is a top view of a transport belt depicting a distribution of transport belt strips configured to receive inkjet maintenance ink drops.

FIG. 3 is a top view of the conveyor belt 52 that depicts a distribution of the conveyor belt strips 204. The conveyor belt 52 is configured for mounting about rollers 48 within the printer 10 so a surface of the belt 52 is exposed in the print zone of the printer to the printheads. The conveyor belt 52 is typically formed with polyimide, which is easily stained by ink pigments because the material has a high adhesion for the pigments in aqueous inks. To form the conveyor belt strips 204 on the conveyor belt 52, a solid endless belt made of polyimide or similar material has apertures drilled or otherwise formed in it except in the areas where a strip 204 is to be located. These areas are coated with an ink repellant material. One such ink repellant coating is fluorinated polyurethane coating. This coating is highly repellant to ink pigments and is very robust to enable reliable cleaning of the strip areas. Other coatings that can be used are silicones, fluorosilicones, modified epoxies, and the like. Alternative methods for forming the conveyor belt 52 with conveyor belt strips is to formed the conveyor belt with apertures in it using a conventional manner and then applying an adhesive to strips made of an ink repellant material and then fixing the strips to the conveyor belt to cover the apertures in the areas where conveyor belt strips are to be located. Another alternative method for making a conveyor belt with conveyor belt strips is to form the conveyor belt without apertures in a conventional manner, apply an ink repellant coating over the entire exterior surface of the belt, and then drill or otherwise form apertures in the belt except in the areas where conveyor belt strips are to be located. The conveyor belt strips 204 are separated from one another in the process direction by various predetermined distances. That is, the conveyor belt strips 204 are not separated from one another in the process direction by the same distance. The conveyor belt strips are also arranged so the ends of adjacent strips in the process direction overlap one another in the cross-process direction as can be seen in FIG. 3 by comparing the ends of strips 204A and 204B and the ends of strips 204B and 204C. As used in this document, the term "adjacent conveyor belt strips" means conveyor belt strips that have no intervening conveyor belt strips between them in the process direction.

This distribution of the conveyor belt strips enables maintenance ink drops to be ejected onto the strips 204 at both the leading and the trailing edges of the media sheet. As noted previously, the controller 80 is configured with programmed instructions to track the positions of the IDZs between adjacent media sheets with reference to the leading and trailing edges of the conveyor belt strips passing through the print zone. When a portion or all of a conveyor belt strip is exposed in an IDZ to at least one printhead in the print zone, the printhead opposite the exposed conveyor belt strip can be operated to eject ink drops onto the belt strip.

Figure 4:
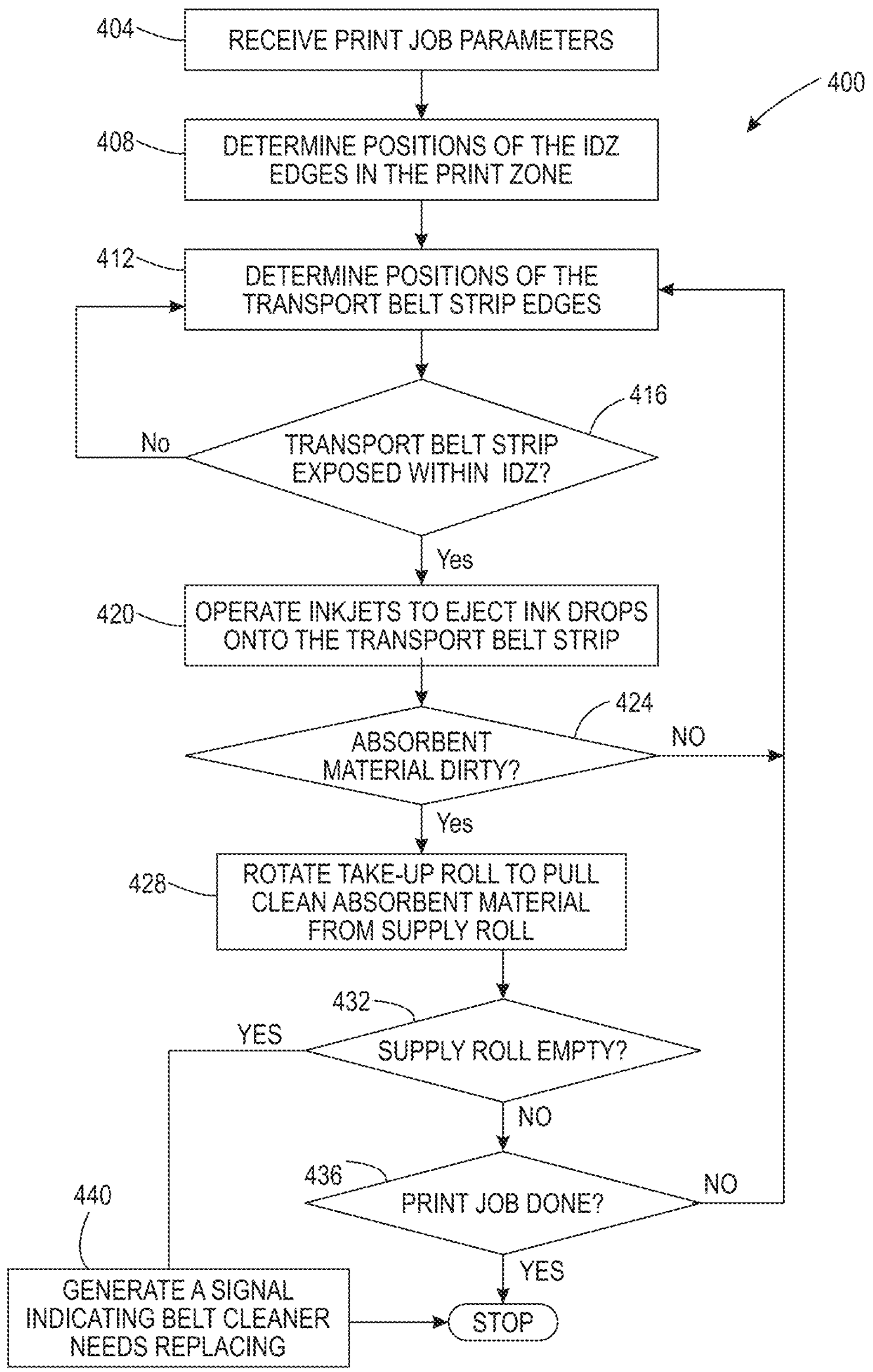
FIG. 4 is a flow diagram of a process for operating the printer of FIG. 1 to maintain the operational status of the inkjets in the printheads while eliminating sneeze patterns, flush lines, or waste of media sheets.

A process 400 for maintaining the operational status of the inkjets in the printheads of an inkjet printer without using sneeze patterns, flush lines, or wasting media sheets is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 400 in FIG. 4 begins with receipt of print job parameters (block 404). Using one or more print job parameters regarding the media being printed in a print job, such as dimensions of the media sheet being printed, the process determines the positions of the leading and trailing edges of the IDZs between adjacent media sheets as they pass through the print zone (block 408). The positions of the leading and trailing edges of the conveyor belt strips on the conveyor belt within the print zone are also identified (block 412). When the process determines that a portion of a conveyor belt strip is exposed to at least one printhead in an IDZ (block 416), inkjets opposite the exposed conveyor belt strip are operated to eject ink drops that help maintain the operational status of the inkjets (block 420). The process also determines when the absorbent material in the conveyor belt cleaner needs to be advanced to provide clean absorbent material (block 424) and operates an actuator to advance the absorbent material (block 428). The need to advance the absorbent material can be determined on a timed period basis, counting the number of conveyor belt strips cleaned by the material, or by the number of sheets printed since the last material advance, or the like. The process continues by determining whether the cleaning material supply is exhausted (block 432) or whether the print job is completed (block 436). If the cleaning material supply is exhausted, then a signal is generated indicating the roll of absorbent material needs replacement (block 440) and the process stops. If the print job is completed, then the process stops.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of operating inkjets in an inkjet printer to eject ink drops to maintain an operational status of the inkjets comprising:

operating inkjets to eject ink drops onto a first area of a media transport that is coated with an ink repellant material, the first area is exposed to the inkjets between a trailing edge of a first media sheet and a leading edge of a second media sheet that follows the first media sheet in a process direction, the first area of the media transport exposed to the inkjets having a length in a cross-process direction that is less than a length of the media transport in the cross-process direction;

operating inkjets to eject ink drops onto a second area of the media transport that is coated with the ink repellant material, the second area is exposed to the inkjets between the trailing edge of the second media sheet and a leading edge of a next media sheet in the process direction, the second area of the media transport having a length in the cross-process direction that is less than the length of the media transport in the cross-process direction and the second area of the media transport being offset from the first area of the media transport in the cross-process direction so at least one end of the first area and at least one end of the second area of the media transport do not overlap each other in the cross-process direction; and removing the ejected ink drops from the first and the second areas of the media transport after the first and second areas of the media transport exit a print zone in the inkjet printer.

2. The method of claim 1 wherein the first and second areas of the media transport are coated with fluorinated polyurethane.

3. The method of claim 1 wherein the first and second areas of the media transport are coated with a silicone, fluorosilicone, or epoxy.

4. The method of claim 1, the removal of the ejected ink drops further comprising:

contacting the areas of the media transport onto which the ink drops were ejected with an absorbent material.

5. The method of claim 4 further comprising:

operating an actuator to rotate a roll of the absorbent material to pull clean absorbent material into contact with the areas of the media transport.

6. The method of claim 5 wherein the absorbent material consists essentially of cellulose or nylon material.

7. The method of claim 1 further comprising:

returning the areas of the media transport coated with the ink repellant material to the print zone of the inkjet printer.

8. An inkjet printer comprising:

a conveyor belt configured to carry media sheets through the inkjet printer, the conveyor belt having conveyor belt strips that are coated with ink repellant material, the conveyor belt strips having a length in a cross-process direction that is less than a length of the media transport in the cross-process direction and conveyor belt strips on the media transport that are adjacent to one another in the process direction are offset from one another in the cross-process direction so at least one end of a first conveyor belt strip and at least one end of a second conveyor belt strip that follows the first conveyor belt strip and is adjacent to the first conveyor belt strip in the process direction do not overlap each other in the cross-process direction;

at least one printhead configured to eject ink drops as the media sheets pass the at least one printhead;

a controller operatively connected to the at least one printhead, the controller being configured to:

operate inkjets in the at least one printhead to eject ink drops onto the first conveyor belt strip and the second conveyor belt strip when the first and the second conveyor belt strips are within inter-document zones between media sheets on the media transport that are adjacent one another in the process direction.

9. The inkjet printer of claim 8, the controller being further configured to:

identify when one of the conveyor belt strips is in the inter-document zone between the first media sheets that are adjacent to one another in the process direction.

10. The inkjet printer of claim 9 further comprising:

a first roller configured to receive a roll of absorbent material;

a second roller configured to receive one end of the absorbent material that extends from the roll of absorbent material mounted on the first roller;

an actuator operatively connected to the second roller, the actuator being configured to rotate the second roller; and the controller is further configured to operate the actuator to pull clean absorbent material from the roll of absorbent material into contact with the conveyor belt.

11. The inkjet printer of claim 10 further comprising:

a sensor configured to generate a signal indicating the roll of absorbent material has been exhausted; and the controller is operatively connected to the sensor, the controller being further configured to generate a signal indicating the roll of absorbent material needs replacing.

12. The inkjet printer of claim 11 wherein the absorbent material consists essentially of cellulose or nylon material.

13. The inkjet printer of claim 11 wherein the conveyor belt strips on the media transport belt are coated with fluorinated polyurethane.

14. The inkjet printer of claim 11 wherein the conveyor belt strips on the media transport belt are coated with a silicone, fluorosilicone, or epoxy.

15. A conveyor belt for an inkjet printer comprising:

an endless belt configured to be wound about a plurality of rollers to position a portion of the endless belt opposite at least one printhead in the inkjet printer; and a plurality of conveyor belt strips on the endless belt that are coated with an ink repellant material, adjacent conveyor belt strips on the endless belt in a process direction have a length in a cross-process direction that is less than a distance across the endless belt in the cross-process direction and adjacent conveyor belt strips on the media transport are offset from one another in the cross-process direction so at least one end of a first conveyor belt strip and at least one end of a second conveyor belt strip that follows the first conveyor belt strip in the process direction do not overlap each other in the cross-process direction.

16. The conveyor belt of claim 15 wherein adjacent conveyor belt strips on the endless belt in the process direction are separated from one another in the process direction by one of at least two different distance intervals.

17. The conveyor belt of claim 15 wherein the coated areas on the endless belt are coated with fluorinated polyurethane.

18. The conveyor belt of claim 15 wherein the coated areas on the endless belt are coated with a silicone, fluorosilicone, or epoxy.

* * * * *